United States Patent Office 3,509,808
Patented May 5, 1970

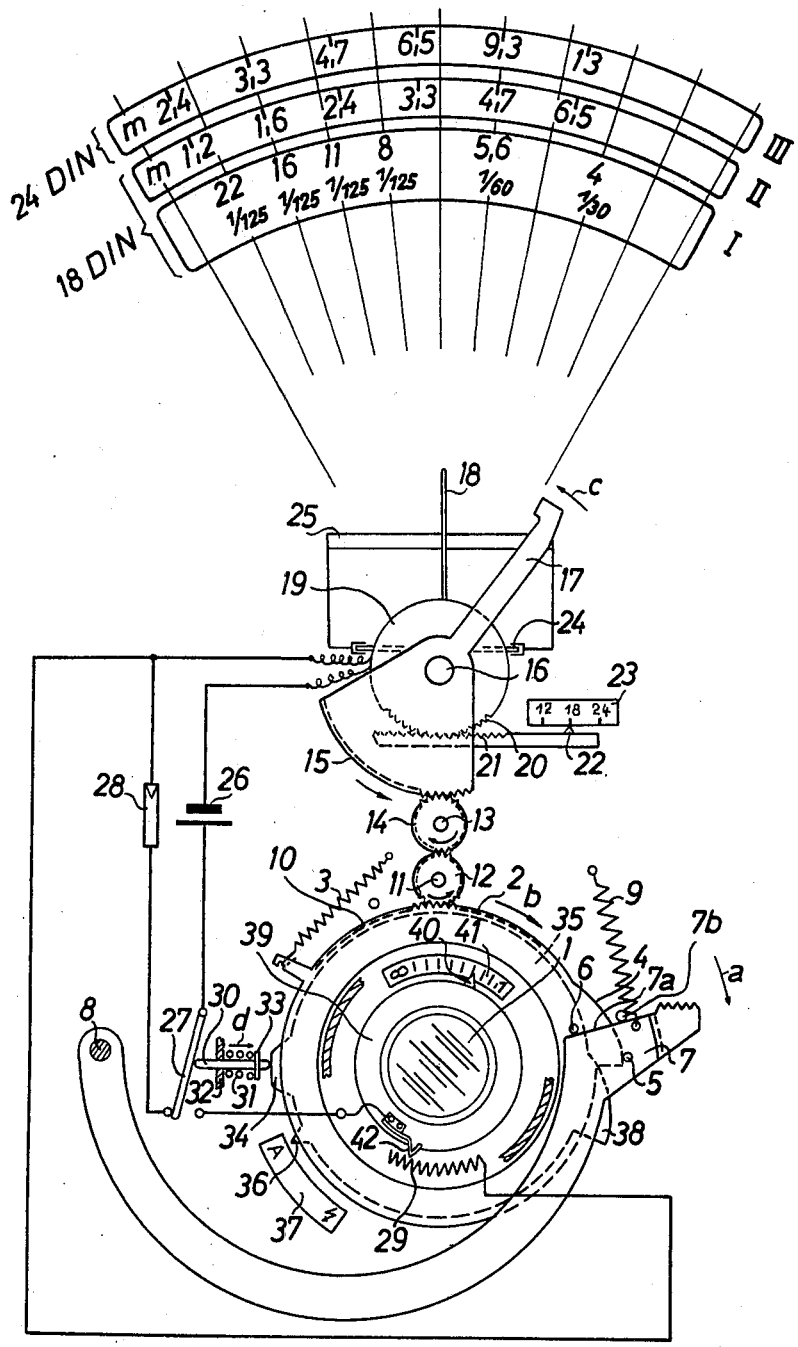

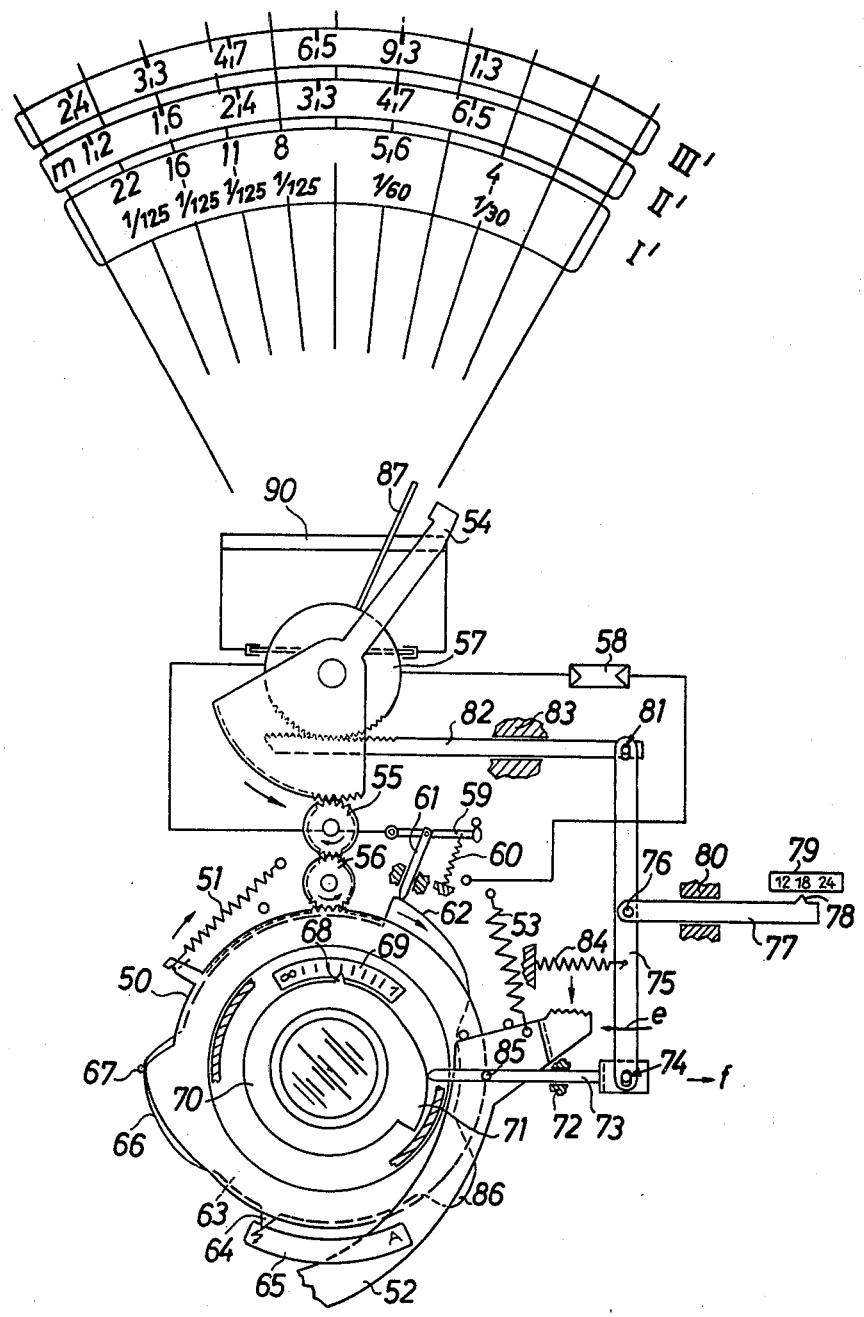

3,509,808
CAMERA FOR DAYLIGHT AND FLASH PHOTOGRAPHY
Richard Wick, Grunwald, near Munich, and Karl Wagner, Ottobrunn, Germany, assignors to Agfa-Gevaert AG, Munich, Germany
Filed Mar. 7, 1967, Ser. No. 621,319
Claims priority, application Germany, Mar. 18, 1966,
A 51,883
Int. Cl. G03b 9/02
U.S. Cl. 95—64                              10 Claims

ABSTRACT OF THE DISCLOSURE

An exposure regulating device for still cameras which selects the exposure time and the size of the aperture as a function of scene brightness when the camera is set for operation in daylight. The exposure time is selected in advance and the size of the aperture is selected by the focus adjusting member when the camera is set for operation with flash. The aperture sizes which are selected by the focus adjusting member are not the optimum sizes for the particular distances from the subject, but the divergence is relatively small. However, and because of such divergence, the camera can be used with films having different speeds or with flash units having different guide numbers.

BACKGROUND OF THE INVENTION

The present invention relates to cameras for daylight and flash photography. More particularly, the invention relates to improvements in photographic cameras of the type wherein the exposure time and the size of the diaphragm aperture may be selected as a function of scene light when the exposures are made in daylight and wherein the exposure time is selected automatically when the camera is set for operation with flash. Still more particularly, the invention relates to cameras of the type wherein the focus adjusting member can select the size of the aperture prior to making an exposure with flash. The flash unit may be built into or is detachable from the camera.

In presently known cameras of the above outlined character, changes in the angular position of the galvanometer needle automatically effect changes in the exposure time and in the size of the aperture, at least for a certain range of light intensities during operation in daylight. When the camera is set for operation with flash, the exposure time remains unchanged. Therefore, each displacement of the needle through an angle which, during operation in daylight, necessitates a change in the exposure time and in the size of the aperture by half a step necessitates a change in the size of the aperture by a full step when the camera is used in artificial light; otherwise, the selected combination of exposure time and size of the aperture will not be a true function of the intensity of artificial light. This can be achieved for a film of given sensitivity but the exposure will be quite unsatisfactory when such a film is replaced by one having a higher or lower sensitivity.

Accordingly, it is an important object of our invention to provide a camera of the above outlined character with an exposure regulating device which is constructed and assembled in such a way that the camera will make satisfactory exposures in daylight, in artificial light, and can utilize films having different speeds or sensitivities.

Another object of the invention is to provide a camera whose operation in daylight is fully automatic or semi-automatic, wherein the size of the aperture may be selected by the focus adjusting means when the camera is operated with flash, and wherein the exposure regulating device will select the optimum size of the aperture and the optimum exposure time for at least one specific distance from the subject during operation with flash, even if a film of first sensitivity is replaced with a film of different sensitivity. A further object of the invention is to provide a camera wherein the aforementioned versatility can be achieved with a minimum of parts and regardless of whether the flash unit is built into or is detachable from the camera.

An additional object of the invention is to provide a camera of the above outlined character wherein the aperture size can be selected by the focus adjusting means with an accuracy which is satisfactory for amateur and professional photography despite the fact that the operation with flash can be carried out by utilizing films of different speeds.

SUMMARY OF THE INVENTION

Briefly outlined, one feature of our invention resides in the provision of an exposure regulating device which is incorporated in a camera for daylight and flash photography. The camera may include a built-in or a detachable flash unit. The exposure regulating device comprises focus adjusting means, adjustable setting means including diaphragm means arranged to provide a series of exposure values constituted by different sizes of the exposure aperture and shutter means also arranged to provide a series of exposure values constituted by different exposure times, and built-in exposure meter means having output means movable to a first plurality of positions in response to such changes in scene brightness during operation in daylight which necessitate adjustment of the setting means by one exposure value (for example a one-step reduction of the size of the aperture or a reduction of the exposure time from a given time to the next shorter time). The output means is also movable to a second plurality of positions in response to such changes in scene brightness during operation with flash which necessitate full-size changes of the aperture (for example, from 5.6 to 8 or 4), and the distances between the second plurality of positions exceed the distances between the first plurality of positions. At least one intermediate position of the first plurality preferably coincides, at least substantially, with one intermediate position of the second plurality.

The exposure meter means further includes an electric circuit having a light-sensitive element which is operatively connected with and effects displacements of the output means during operation in daylight. During operation with flash, the output means is caused to change its position in response to manipulation of the focus adjusting means.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a diagrammatic front elevational view of a still camera which embodies one form of my invention and is set for operation in daylight; and FIG. 2 is a similar view of a second camera which is set for operation in artificial light.

DESCRIPTION OF THE PREFERRED EMBODIMENTS

Referring first to FIG. 1, there is shown a portion of a still camera which comprises an objective 1 and an exposure regulating device including a diaphragm represented by a ring 2 which is rotatable about the optical axis. The ring 2 is biased by a helical return spring 3 which tends to rotate it in a clockwise direction, as viewed in FIG. 1, and can change the position of several diaphragm blades which are not shown in the drawing. The manner in which the blades are coupled with the ring 2 is well known in the art of cameras. The shutter of the exposure regulating device is represented by a retard mechanism including a follower pin 5 which cooperates with a cam 4 of the diaphragm ring 2. The ring 2 further carries a post 6 which is biased by the spring 3 to normally bear against an edge face 7a of a release trigger 7 here shown as an arcuate lever which is rockable on a fixed pivot pin 8 and is biased by a relatively strong return spring 9. In the illustrated idle or starting position, the release trigger 7 abuts against a fixed stop pin 7b. FIG. 1 shows the diaphragm ring 2 in cocked position because the edge face 7a of the release trigger 7 abuts against the stop in 7b so that the return spring 3 stores energy. The diaphragm and the shutter together constitute the setting means of the exposure regulating device.

The ring 2 comprises a toothed or serrated portion 10 which meshes with a pinion 12 rotatable on a shaft 11. The pinion 12 further meshes with a larger pinion 14 which is rotatable on a shaft 13. The pinion 14 meshes with the toothed or serrated portion 15 of a tracking or scanning member 17 which is freely turnable on a shaft 16. The scanning member 17 can cooperate with the output member or needle 18 of a moving-coil galvanometer whose housing 19 is freely turnable on the shaft 16 independently of the scanning member 17. The means for changing the angular position of the galvanometer housing 19 (this housing constitutes a movable support for the needle 18) comprises a toothed rack 21 which meshes with a toothed portion 20 on the housing and is reciprocable by hand. The rack 21 carries an index 22 which can be placed into registry with selected graduations on a fixed scale 23. The graduations on the scale 23 indicate different film speeds or sensitivities; in the present instance, the scale 23 is calibrated in DIN norms. The means for temporarily clamping or arresting the needle 18 in a given angular position which is indicative of scene brightness comprises a jaw 25 which is rockable on a pivot 24 and is operatively connected with the release trigger 7 so that it automatically engages and arrests the needle 18 when the trigger is moved from its starting position. Such operative connections between a needle-clamping jaw and a release trigger are well known in the art of cameras. The needle 18 is then held in abutment with a stationary back support which is not shown in the drawing.

The galvanometer is connected into an electric circuit which forms part of the exposure meter means in the exposure regulating device. The circuit further comprises a suitable source 26 of electrical energy (e.g., one or more batteries or miniature accumulators) connected in series with a two-way control switch 27 and a light-sensitive resistor element 28. The variable resistor 29 is disconnected when the movable contact of the control switch 27 assumes the first position shown in FIG. 1 and resistor element 28 is disconnected when the movable contact of the control switch 27 assumes its second position. The means for changing the position of the movable contact of the control switch 27 comprises a reciprocable follower 30 which is guided by a fixed bearing member 32 and carries a collar 33 biased by a helical spring 31. The follower 30 is shown in abutment with a cam lobe 34 provided on the periphery of a ring-shaped selector 35 which is rotatable about the optical axis. The selector 35 carries an index 36 which can be placed into registry with one of two symbols or graduations on a fixed scale 37. The symbol A indicates that the selector 35 has set the camera for automatic selection of exposure values (exposure time and/or the size of the diaphragm aperture), and the other symbol resembles a thunderbolt and indicates that the camera is set for operation with flash. The selector 35 is turnable by hand and its cam lobe 34 will hold the follower 30 in the illustrated position when the camera is set for operation in daylight, i.e., when the exposure time and the size of the diaphragm aperture should be selected automatically as a function of the intensity of scene light. The resistor element 28 is mounted in such a way that it is exposed to light reflected from the scene or subject of which a picture is to be made.

The selector 35 carries a second cam lobe 38 which cooperates with the follower pin 5 of the retard mechanism for the shutter when the index 36 registers with the thunderbolt symbol on the scale 37. In this way, the selector 35 automatically determines one exposure value (namely, the exposure time) for operation with flash, for example, an exposure time of 1/30 of a second.

The camera further comprises a ring-shaped focus adjusting member 39 which is rotatable about the optical axis and carries an index 40 which can be placed into registry with graduations on a fixed distance scale 41. The focus adjusting member 39 further carries the slider 42 of the variable resistor 29 to select the resistance of the later as a function of the distance from the subject and to thereby effect movement of the needle 18 to one flash. The focus adjusting member 39 cannot affect the size of the aperture or the exposure time when the selector of a plurality of second positions during operation with 35 is adjusted to set the camera for operation in daylight.

The operation is as follows:

FIG. 1 illustrates the camera in a condition ready to make an exposure in daylight. If the operator decides to depress the reelase trigger 7 so that the latter is turned in the direction indicated by an arrow a, the return spring 3 is free to contract and causes the diaphragm ring 2 to turn in a clockwise direction as indicated by an arrow b. The toothed portion 10 of the ring 2 rotates the gear train 12, 14 so that the scanning member 17 is caused to turn in a counter-clockwise direction and moves its tip into abutment with the needle 18. The angular position of the needle 18 is a function of the intensity of scene light (the light-sensitive resistor element 28 is connected in the circuit of the exposure meter means because the cam lobe 34 of the selector 35 maintains the follower 30 in the position shown in FIG. 1), and the needle 18 is clamped in such angular position by the jaw 25 which is rocked about the pivot 24 in response to depression of the release trigger 7. When the scanning member 17 is arrested by the needle 18, the pinion 12 prevents further rotation of the ring 2 under the bias of the return spring 3 whereby the ring 2 holds the blades of the diaphragm in a position in which the blades define an aperture whose size is a function of the intensity of scene light. At the same time, the cam of the ring 2 selects the exposure time (by changing the position of the follower pin 5), again as a function of the intensity of scene light.

A series of aperture-exposure time combinations which correspond to a first plurality of angular positions of the needle 18 are shown on the scale I in the upper part of FIG. 1. The upper row of graduations on the scale I indicates various sizes of the aperture and the lower row indicates the corresponding exposure times. It will be seen that, if the aperture is reduced from "4" to "8," the exposure time is reduced from 1/30 sec. to 1/125 sec. The exposure time (1/125 sec.) thereupon remains unchanged even if the size of the aperture is reduced from "8" to "11," "16" or "22." It follows that (and assuming that the angular distances covered by the needle 18 from exposure value to exposure value are identical) the angle covered by the needle 18 between the larger sizes "4" and "8" of the aperture must be twice the angle covered by the needle between the smaller sizes of the aperture (between "8" and "22"). This will be understood by considering that a predetermined change in scene brightness necessitates an adjustment of the diaphragm and/or shutter to change the exposure value by one step, for example, to change the aperture from "4" to midway between "4" and "5.6," to change the exposure time from 1/30 to midway between 1/30 and 1/60, or to effect a lesser change in aperture simultaneously with a lesser change in exposure time.

In order to make an exposure with flash illumination, the operator turns the selector 35 to place the index 36 into registry with the thunderbolt symbol on the scale 37. The cam lobe 34 is moved away from the follower 30 so that the later is shifted by the spring 31 (see the arrow d) and permits the movable contact of the control switch 27 to assume its second position in which the light-sensitive resistor element 28 is disconnected from the circuit of the exposure meter means and is replaced by the variable resistor 29. The movable contact of the control switch 27 is preferably elastic and tends to automatically assume the second position to thereby disconnect the resistor element 28. Once the resistor element 28 is disconnected, the angular position of the needle 18 is a function of the resistance of the variable resistor 29, and the resistance of this resistor can be varied as a function of the distance from the scene, i.e., in response to displacement of the slider 42 on rotation of the focus adjusting member 39. The distances from the scene are indicated as graduations on a scale II shown for convenience in the upper part of FIG. 1. The arrangement is such that, when the index 40 of the focus adjusting member 39 registers with a given graduation on the fixed distance scale 41, the needle 18 registers with the same graduation of the scale II. It is assumed that the flash unit used with the camera of FIG. 1 has a guide number of twenty-six and that the sensitivity of film used for operation with flash is 18 (given in DIN norms and corresponding to ASA No. 50). A comparison of scales I and II shows that, even though successive sizes of the diaphragm aperture are shown by equidistant graduations, the camera can select the size of the aperture with requisite accuracy when it is used for operation with flash. The optimum relationship between the distances from the subject (in meters) and the sizes of the aperture is as follows:

| Distance: | Aperture size |
|---|---|
| 1.6 | 16 |
| 1.2 | 22 |
| 2.4 | 11 |
| 3.3 | 8 |
| 4.7 | 5.6 |
| 6.5 | 4 |

Thus, and as shown in the upper part of FIG. 1, the actual relationship between the aperture size and the focal distance is close to the optimum relationship, and the difference is always considerably less than a full step from aperture size to aperture size. For exampe, the graduations 16 (scale I) and 1.6 (scale II) are in full registry. The same holds true for the graduations 5.6 and 4.7.

It is possible to select, for a film of given sensitivity, the sizes of the aperture in such a way that each actually selected size would correspond exactly to the optimum size for a given series of distances from the subject. However, if such film of given sensitivity is replaced by a film having another sensitivity, the divergence between the actualy selected and optimum sizes of the aperture for a given range of distances from the subject or scene will be much greater than in the example which was given above. Therefore, we feel that it is more advisable to mount the diaphragm blades in such a way that several sizes of the aperture will deviate, but only slightly, from optimum sizes for a given range of distances from the subject instead of having a perfect coordination for a given film speed but a greater divergence for all other film speeds. The uppermost part of FIG. 1 shows for convenience a second distance scale III (calibrated in meters) which is valid when the sensitivity of film is 24 (in DIN norms) but the guide number of the flash unit remains the same. It will be seen that the actual divergence between the optimum sizes of the aperture and the corresponding distances from the subject is again very small. Were the coordination between the focus adjusting member 39 and diaphragm ring 2 perfect, all of the graduations 13, 9.3, 6.5, 4.7, 3.3 and 2.4 (shown on the scale III) would be in exact registry with the graduations 4, 5.6, 8, 11, 16, and 22 on the scale I. The graduations 9.3 and 5.6 as well as 3.3 and 16 are in exact registry.

The manner in which the rotation of the ring 2 under the bias of its return spring 3 is arrested while the camera makes an exposure with flash is identical with the manner described in connection with operation in daylight, i.e., the angular position of the needle 18 will be a function of the resistance of the resistor 29 and the scanning member 17 will arrest the ring 2 when it reaches the needle. Of course, the operator will select the initial position of the galvanometer housing 19 by shifting the rack 21 if the film in the camera is replaced with one having a different speed. This will also change the position of the needle 18.

The camera of FIG. 2 comprises a diaphragm ring 50 which is biased by a return spring 51. The release trigger 52, its spring 53, and the gear train 56, 55 between the ring 50 and scanning member 54 are functional equivalents of the parts 7, 9 and 12, 14 of FIG. 1. The exposure meter means of the camera shown in FIG. 2 comprises a somewhat different electric circuit which includes a moving-coil galvanometer having a housing 57 which constitutes a movable support for an output member or needle 87, a light-sensitive cell element 58, and an interrupter switch 59 connected in series with the cell element 58 and galvanometer 57. The movable contact of the interrupter switch 59 is biased by a spring 60 which tends to maintain it in a circuit-closing or completing position. The cell element 58 can be replaced by a light-sensitive resistor element and a source of electrical energy. The movable contact of the interrupter switch 59 is further coupled with a pin-shaped follower 61 which can cooperate with a cam lobe 62 provided on a ring-shaped manually operable selector 63 having an index 64 which cooperates with a fixed scale 65 corresponding to the scale 37 of FIG. 1. The interrupter switch 59 is open when the camera is set for operation with flash because the follower 61 is then engaged by the lobe 62. It will be seen that FIG. 2 illustrates the camera in the condition for operation with flash because the index 64 of the selector 63 registers with the thunderbolt symbol of the scale 65. The selector 63 has a second cam lobe 66 which cooperates with the follower pin 67 of a retard mechanism for the shutter (not shown). In the illustrated position, the selector 63 has adjusted the shutter to provide an optimum exposure time for operation with flash.

A ring-shaped focus adjusting member 70 carries an index 68 which cooperates with a fixed distance scale 69, and the focus adjusting member 70 further carries a cam lobe 71 which can displace a tracking element 73 of a motion transmitting unit here shown as an integrator mechanism. The tracking element 73 is slidable in a fixed bearing 72 and is coupled to one arm of a two-armed integrator lever 75 by means of a pin-and-slot connection 74. The lever 75 is fulcrumed on the pin 76 of a reciprocable slide-like input member 77 having an index 78 cooperating with a fixed scale 79 whose graduations indicate different film speeds. The camera further comprises suitable detent means (not shown) for yieldably holding the input member 77 in selected positions of adjustment. The other arm of the two-armed integrator lever 75 is coupled to a second tracking element 82 by means of a second pin-and-slot connection 81. The tracking element 82 is reciprocable in a bearing 83 and constitutes a rack corresponding to the rack 21 of FIG. 1 and meshing with a toothed portion on the housing 57 of the galvanometer. Thus, by changing the position of the input member 77, the operator can select the initial angular position of the galvanometer housing 57 as a function of the film speed. A third fixed bearing 80 serves to guide the input member 77 during manual adjustment to account for the speed of that film which is being used in the camera. A helical spring 84 is attached to the lower arm of the lever 75 and tends to rock it in a clockwise direction, as indicated in FIG. 2 by an arrow e, so that the tracking element 73 invariably abuts against the focus adjusting member 70.

The purpose of the integrator mechanism 73, 75, 77, 82, is to select the angular position of the galvanometer housing 57 not only as a function of the film speed but also as a function of the distance from the subject, whenever the camera is set for operation with flash. The focus adjusting mmeber 70 cannot influence the aperture or the exposure time when the camera operates in daylight because the tracking element 73 carries a pin 85 which is engaged by a cam lobe 86 of the selector 63 when the index 64 is moved into registry with hte symbol A on the scale 65. The lobe 86 moves the tracking element 73 in the direction indicated by an arrow f and maintains it in a given position as long as the camera remains set for operation in daylight. In other words, the integrator mechanism then adjusts the galvanometer housing 57 only as a function of the film speed, depending on the selected position of the input member 77.

In the position of FIG. 2, the selector 63 has caused its cam lobe 62 to open the interrupter switch 59 so that the circuit of the exposure meter means is deenergized because the camera is set for operation with flash. The galvanometer housing 57 contains a suitable spring of conventional construction (not shown in FIG. 2) which automaticaly holds the needle 87 in a given starting position when the interrupter switch 59 assumes its open position. Prior to making an exposure with flash, the operator moves the input member 77 into such position that its index 78 registers with a given graduation of the scale 79 (to account for the speed of film which is being used in the camera) and the focus adjusting member 70 is operated to place its index 68 into registry with that graduation on the scale 69 which indicates the actual distance from the scene or subject. Thus, the angular position of the galvanometer housing 57 is then a function of the distance from the subject or scene and also a function of the film speed. The needle 87 turns with the housing 57 of the galvanometer and its regular position reflects the film speed and the distance from the subject or scene. It is to be noted that the aforementioned non-illustrated spring maintains the needle 87 in a given angular position with reference to the housing 57 of the galvanometer but that the needle shares all angular movements of the galvanometer housing in response to linear displacement of the tracking element 82. If the operator thereupon depresses the release trigger 52, the spring 51 contracts and rotates the diaphragm ring 50 until the tip of the scanning member 54 reaches the needle 87. The needle is clamped by the jaw 90 in automatic response to depression of the trigger 52.

The scales I', II', III', in the upper part of FIG. 2 correspond to the scales I, II, III of FIG. 1, and their interpretation is the same as described in connection with FIG. 1. All of these scales are shown only for convenient understanding of the invention, i.e., they are not applied to the camera.

Of course, the exposure regulating device is susceptible of many additional modifications without departing from the spirit of our invention. The inventive concept can be embodied in all such cameras wherein the needle of the galvanometer serves as a stop for a movable scanning member. Furthermore, the scanning member 17 or 54 need not be moved into actual abutment with the needle 18 or 87 because it is equally possible to move the scanning member by hand into a position of registry with the needle. Also, the camera may comprise a fixedly mounted galvanometer and the readings furnished by the output member of such galvanometer are then utilized for proper adjustment of the shutter and the diaphragm.

If the camera is to be used with flash units having different guide numbers, the scale 23 or 79 will be provided with graduations indicating a series of guide numbers. The housing 19 or 57 is then adjusted by rack 21 or element 82 to account for the guide number of the flash unit which is utilized during operation with flash.

As stated before, the camera of our invention will not provide an "optimum" size of the aperture for each distance from the subject during operation with flash. The divergence between the "optimum" size and the size actually selected by the focus adjusting member 39 or 70 is relatively small and is well within the limits necessary for making of satisfactory exposures. In other words, the actual size of the aperture is not identical with that which can be arrived at by resorting to the well known guide number formula. However, such calculation is not entirely accurate because it does not take into consideration that actual illumination of a subject during operation with flash depends not only from the intensity of light which issues from the flash unit but also from such light which is reflected on the walls of the enclosure wherein the exposure with flash is being made. Thus, the guide number allows for the calculation of an approximate size of the diaphragm aperture.

Our present invention solves the long-existing problem which arises when the output member of the galvanometer is used to select or determine the size of the aperture for daylight and flash photography and when the exposure regulating device must also select or determine the exposure time as a function of scene brightness when the camera is set for operation in daylight. Were the needle 18 or 87 used solely for selection or determination of the aperture size, the size selected by the focus adjusting member for operation with flash could correspond exactly to the optimum size.

When the needle 18 or 87 must select or determine the size of the aperture and the exposure time, its travel in response to identical changes in scene brightness during operation in daylight is through angles of identical magnitude. This is shown in the upper part of FIG. 1 or 2 by lines drawn radially from the axis of the shaft for the needle 18 or 87 and is the customary procedure for all presently employed types of moving-coil galvanometers. As shown, for example, in FIG. 1, a change in scene brightness by two unit values results in angular displacement of the needle 18 from registry with graduation "4" to registry with graduation "5.6" on the scale I, i.e., by one size of the exposure aperture or by one increment of exposure time. A similar angular displacement of the needle 18 along the left-hand portion of the scale I will necessitate a change in the aperture size from "8" to "16" or from "11" to "22" (i.e., two clicks in the setting of ring 2 or 50) because the exposure time ($\frac{1}{125}$ second) remains unchanged. Otherwise stated, an angular displacement of needle 18 by one unit in response to a change in weak light intensity by one unit value will necessitate a change in the aperture by one-half size because the exposure time also changes by one-half increment. An angular displacement of the needle 18 by one unit in response to a change in strong light intensity will necessitate a change in the aperture by one full size because the exposure time remains unchanged. The connections between the ring 2 and diaphragm blades and between the cam 4 and retard mechanism of the shutter are constructed, configurated and assembled in such a way that the aforeoutlined relationship between the aperture size and exposure time will actually exist during operation in daylight.

If such a camera is to provide automatic selection of aperture sizes during operation with flash, the first problem to be solved is that, in the embodiment in FIG. 1, the light-sensitive resistor element 28 must be replaced by a variable resistor 29. The resistance of the variable resistor 29 in response to manipulation of the focus adjusting member 39 would have to vary at a non-linear rate. Even this could be achieved for a film of given speed; however, and if the galvanometer is to be adjusted for different film speeds during operation with flash as well as during operation in daylight, the problem is much more difficult because the resistance of the variable resistor would have to be different for the same distance from the subject if an artificial-light film of first speed were to be replaced by a film of a different speed. The same problem will arise if the camera is to be used with flash units having different guide numbers.

In accordance with the present invention, the above-outlined problems are solved by minimizing the divergence between the "optimum" aperture size and the actually selected aperture size when the camera is operated with flash. This renders it possible to utilize a single variable resistor 29 or to adjust the galvanometer housing 57 by the integrator mechanism of FIG. 2. During operation with flash, the angles described by the needle 18 or 87 from aperture size to aperture size are greater than the angles described by such needle during operation in daylight for the purpose of changing the aperture by one size, the exposure time by one step, or the aperture size and the exposure time to an extent corresponding to one full exposure value. It is well known that a change in scene brightness by one unit value necessitates a change in aperture by one size, a change in exposure time by one increment, or simultaneous changes in aperture size and exposure time so that such changes correspond to one of the two first mentioned changes. The divergence between actual size of the aperture and the "optimum" size for a given distance from the subject during operation with flash is further reduced if the adjustment is such that an intermediate position of the needle 18 or 87 during operation with flash corresponds exactly to the optimum position. Each of FIGS. 1 and 2 shows two such intermediate positions.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In a camera for operation in daylight and artificial light, an exposure regulating device comprising focus adjusting means movable between a plurality of positions each of which is indicative of a different distance from the subject; automatically adjustable setting means including diaphragm means arranged to provide a series of exposure values representing different sizes of the aperture and shutter means also arranged to provide a series of exposure values representing different exposure times; exposure meter means for adjusting said setting means during operation in daylight and during operation in artificial light, said exposure meter means including output means movable to a first plurality of positions in response to such changes in scene brightness during operation in daylight which necessitate adjustment of said setting means by one exposure value, said output means being movable by said focus adjusting means to a second plurality of equidistant positions during operation in artificial light whereby the movements of said focus adjusting means between said positions thereof correspond to full-size changes of the aperture, the distances between said second plurality of positions of said output means exceeding the distances between said first plurality of positions and at least one position of said first plurality coinciding, at least substantially, with one position of said second plurality, said exposure meter means further including adjustable support means for said output means; and means for adjusting said support means as a function of the speed of film which is used in the camera.

2. An exposure regulating device as defined in claim 1, wherein said first plurality of positions includes an intermediate position and wherein said second plurality of positions also includes an intermediate position which coincides with said first mentioned intermediate position.

3. An exposure regulating device as defined in claim 1, wherein each of said pluralities of positions of said output means includes two intermediate positions and wherein the intermediate positions of said first plurality coincide with the intermediate positions of said second plurality.

4. An exposure regulating device as defined in claim 1, wherein said exposure meter means further includes an electric circuit having light-sensitive means operatively connected with said output means and arranged to select said first plurality of positions during operation in daylight and variable resistor means operatively connected with said output means and arranged to select said second plurality of positions during an artificial light, said focus adjusting means being arranged to change the resistance of said variable resistor means in response to movement between said positions thereof.

5. In a camera for operation in daylight and artificial light, an exposure regulating device comprising focus adjusting means movable between a plurality of positions each of which is indicative of a different distance from the subject; automatically adjustable setting means including diaphragm means arranged to provide a series of exposure values representing different sizes of the aperture and shutter means also arranged to provide a series of exposure values representing different exposure times; exposure meter means including output means movable to a first plurality of positions in response to such changes in scene brightness during operation in daylight which necessitate adjustment of said setting means by one exposure value, said output means being movable by said focus adjusting means to a second plurality of positions during operation in artificial light whereby the movements of said focus adjusting means between said positions thereof correspond to full-size changes of the aperture, the distances between said second plurality of positions of said output means exceeding the distances between said first plurality of positions and at least one position of said first plurality coinciding, at least substantially, with one position of said second plurality, said exposure meter means further including a movable support for said output means, said support being stationary during operation in daylight; means for connecting said support with said focus adjusting means during operation in artificial light so that said focus adjusting means can effect movement of said support and said output means to said second plurality of positions; and means for adjusting said support as a function of the speed of film which is used in the camera.

6. An exposure regulating device as defined in claim 5, further comprising selector means movable by hand between two positions to thereby respectively set the camera for operation in daylight and in artificial light, said exposure meter means further comprising an electric circuit including a light-sensitive element operatively connected with said output means to move the latter between said first plurality of positions in response to changes in scene brightness when said selector means assumes that position in which the camera is set for operation in daylight.

7. An exposure control as defined in claim 6, wherein the operative connection between said light-sensitive element and said output means comprises a switch and further comprising means for opening said switch in response to movement of said selector means to that position in which the camera is set for operation in artificial light.

8. In a camera for operation in daylight and artificial light, an exposure regulating device comprising focus adjusting means movable between a plurality of positions each of which is indicative of a different distance from the subject; automatically adjustable setting means including diaphragm means arranged to provide a series of exposure values representing different sizes of the aperture and shutter means also arranged to provide a series of exposure values representing different exposure times; exposure meter means including output means movable to a first plurality of positions in response to such changes in scene brightness during operation in daylight which necessitate adjustment of said setting means by one exposure value, said output means being movable by said focus adjusting means to a second plurality of positions during operation in artificial light whereby the movements of said focus adjusting means between said positions thereof corresponding to full-size changes of the aperture, the distances between said second plurality of positions of said output means exceeding the distances between said first plurality of positions and at least one position of said first plurality coinciding, at least substantially, with one position of said second plurality, said exposure meter means further including an electric circuit having light-sensitive means operatively connected with said output means and arranged to select said first plurality of positions during operation in daylight and movable support means for said output means; motion transmitting means providing between said focus adjusting means and said support means for moving the latter and said output means to said second plurality of positions during operation in artificial light in response to movement of said focus adjusting means between said positions thereof; and means for adjusting said support means as a function of the speed of film which is used in the camera.

9. An exposure regulating device as defined in claim 8, wherein said motion transmitting means comprises a first element arranged to move said support means to selected positions each corresponding to a different film speed and a second element movable by said focus adjusting means and also arranged to move said support means.

10. In a camera for daylight and flash photography, an exposure regulating device comprising focus adjusting means; adjustable setting means including diaphragm means arranged to provide a series of exposure values constituted by different sizes of the aperture and shutter means also arranged to provide a series of exposure values constituted by different exposure times; exposure meter means including output means movable to a first plurality of positions in response to such changes in scene brightness during operation in daylight which necessitate adjustment of said setting means by one exposure value, said output means being movable to a second plurality of positions in response to such changes in scene brightness during operation with flash which necessitate full-size changes of the aperture, the distances between said second plurality of positions of said output means exceeding the distances between said first plurality of positions and at least one position of said first plurality coinciding, at least substantially, with one position of said second plurality, said exposure meter means further including an electric circuit having light-sensitive means operatively connected with said output means and arranged to select said first plurality of positions during operation in daylight and movable support means for said output means; and motion transmitting means provided between said focus adjusting means and said support means for moving the latter and said output means to said second plurality of positions during operation with flash in response to manipulation of said focus adjusting means, said motion transmitting means constituting an integrator mechanism which includes a first element arranged to move said support means to selected positions each corresponding to a different film speed, a second element movable by said focus adjusting means and also arranged to move said support means, a reciprocable input member movable to a plurality of positions each corresponding to a different film sensitivity, and a two-armed lever fulcrumed on said input member, one of said elements being coupled to one arm of said lever and being directly connected with said support and the other of said elements being coupled to the other arm of said lever and being in direct motion-receiving engagement with said focus adjusting means.

References Cited

UNITED STATES PATENTS

| 2,990,758 | 7/1961 | Sauer et al. | 95—64 XR |
| 3,022,714 | 2/1962 | Rentschler | 95—64 XR |
| 3,025,777 | 3/1962 | Wilkenson | 95—31 XR |
| 3,283,681 | 11/1966 | Singer et al. | |
| 3,285,149 | 11/1966 | Fahlenberg et al. | |

NORTON ANSHER, Primary Examiner

D. S. STALLARD, Assistant Examiner

U.S. Cl. X.R.

95—10